(12) United States Patent
Mizusawa

(10) Patent No.: US 10,053,169 B2
(45) Date of Patent: Aug. 21, 2018

(54) CRAWLER

(71) Applicant: BRIDGESTONE CORPORATION, Chuo-ku, Tokyo (JP)

(72) Inventor: Takashi Mizusawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/578,242

(22) PCT Filed: May 31, 2016

(86) PCT No.: PCT/JP2016/066044
§ 371 (c)(1),
(2) Date: Nov. 30, 2017

(87) PCT Pub. No.: WO2016/194905
PCT Pub. Date: Dec. 8, 2016

(65) Prior Publication Data
US 2018/0148113 A1    May 31, 2018

(30) Foreign Application Priority Data
Jun. 4, 2015  (JP) .................................. 2015-114141

(51) Int. Cl.
*B62D 55/24*  (2006.01)
*B62D 55/253*  (2006.01)

(52) U.S. Cl.
CPC ......... *B62D 55/244* (2013.01); *B62D 55/253* (2013.01)

(58) Field of Classification Search
CPC .... B62D 55/24; B62D 55/244; B62D 55/253; B62D 55/08
See application file for complete search history.

(56) References Cited

U.S. PATENT DOCUMENTS

| | | | | | |
|---|---|---|---|---|---|
| 1,807,133 | A | * | 5/1931 | Pennington | F16H 7/023 305/165 |
| 3,072,443 | A | * | 1/1963 | Yoe | B62D 55/247 305/135 |
| 4,721,498 | A | * | 1/1988 | Grob | F16G 1/08 474/261 |

(Continued)

FOREIGN PATENT DOCUMENTS

| | | |
|---|---|---|
| JP | 2002-178965 A | 6/2002 |
| JP | 2013-166475 A | 8/2013 |
| JP | 2013-244845 A | 12/2013 |

OTHER PUBLICATIONS

International Search Report issued in International Application No. PCT/JP2016/066044 dated Jun. 28, 2016.

*Primary Examiner* — Jason R Bellinger
(74) *Attorney, Agent, or Firm* — SOLARIS Intellectual Property Group, PLLC

(57) ABSTRACT

A main cord layer is embedded in a crawler main body, and a first bias cord layer, a second bias cord layer, a third bias cord layer and a fourth bias cord layer are embedded at an outer peripheral side of the main cord layer. Bias cords of the second bias cord layer and bias cords of the third bias cord layer are inclined in a direction that is opposite, with respect to a crawler circumferential direction, bias cords of the fourth bias cord layer that are inclined with respect to the crawler circumferential direction.

15 Claims, 8 Drawing Sheets

(56) References Cited

U.S. PATENT DOCUMENTS

| | | | | |
|---|---|---|---|---|
| 7,823,988 | B2* | 11/2010 | Song | B62D 55/244 |
| | | | | 305/167 |
| 8,567,877 | B2* | 10/2013 | Ijiri | B62D 55/244 |
| | | | | 305/166 |
| 9,434,429 | B2* | 9/2016 | Mizusawa | B62D 55/244 |
| 9,902,445 | B2* | 2/2018 | Sugihara | B62D 55/24 |
| 9,932,077 | B2* | 4/2018 | Sugihara | B62D 55/24 |
| 2004/0235600 | A1 | 11/2004 | Piou et al. | |
| 2014/0001829 | A1* | 1/2014 | Uchiyama | B62D 55/244 |
| | | | | 305/167 |
| 2015/0091372 | A1 | 4/2015 | Mizusawa | |
| 2017/0057575 | A1* | 3/2017 | Mizusawa | B62D 55/244 |

\* cited by examiner

CRAWLER

CROSS-REFERENCE TO RELATED APPLICATIONS

The present application is a U.S. national stage application of application PCT/JP2016/066044, which was filed May 31, 2016, which claims priority to Japanese Patent Application 2015-114141, which was filed on Jun. 4, 2015. The present application hereby incorporates by reference both applications referenced above.

TECHNICAL FIELD

The present disclosure relates to a crawler that is formed by using an elastic material.

BACKGROUND ART

Japanese Patent Application Laid-Open (JP-A) No. 2002-178965 discloses a rubber crawler that has a main cord layer, which is structured to include main cords that extend along the crawler circumferential direction, and three bias cord layers that are structured to include bias cords that are inclined with respect to the crawler circumferential direction. The bias cords of the bias cord layers are inclined, with respect to the crawler circumferential direction, in the direction opposite that of the bias cords of the other bias cord layers that are adjacent.

SUMMARY OF INVENTION

Technical Problem

Accompanying the increased sizes and increased horsepower of machine bodies on which crawlers are mounted in recent years, improvements in rigidity have been demanded of crawlers. If the layered number of bias cord layers that are reinforcing layers is increased, the rigidity of the crawler improves, but, if the bias layers are increased, it becomes easy for shearing deformation to arise, and the straight traveling ability of the crawler deteriorates.

The subject of embodiments of the present invention is the provision of a crawler at which the straight traveling ability can be ensured while the rigidity is improved.

Solution to Problem

A crawler relating to a first aspect of the present invention comprises: a crawler main body that is formed of an elastic material and is shaped as an endless belt; a first bias cord layer that is embedded in the crawler main body, and at which first bias cords, which extend at an incline with respect to a crawler circumferential direction, are lined up in the crawler circumferential direction; a second bias cord layer that is embedded in the crawler main body and is disposed at a crawler outer peripheral side of the first bias cord layer, and at which second bias cords, which extend at an incline in a direction opposite to a direction of inclination of the first bias cords with respect to the crawler circumferential direction, are lined up in the crawler circumferential direction; a third bias cord layer that is embedded in the crawler main body and is disposed at a crawler outer peripheral side of the second bias cord layer, and at which third bias cords, which extend at an incline in a same direction as a direction of inclination of the second bias cords with respect to the crawler circumferential direction, are lined up in the crawler circumferential direction; and a fourth bias cord layer that is embedded in the crawler main body and is disposed at a crawler outer peripheral side of the third bias cord layer, and at which fourth bias cords, which extend at an incline in a direction opposite to a direction of inclination of the third bias cords with respect to the crawler circumferential direction, are lined up in the crawler circumferential direction.

In accordance with the crawler relating to the first aspect, four bias cord layers which are the first bias cord layer, the second bias cord layer, the third bias cord layer and the fourth bias cord layer are provided from the inner peripheral side toward the outer peripheral side. Therefore, the rigidity can be improved as compared with a crawler in which three bias cord layers are provided. Here, rigidity is, more specifically, shearing rigidity, torsional rigidity, bending rigidity, tensile rigidity, and the like.

At the crawler, at the portion that is wound around a wheel (hereinafter called "wound-around portion"), the respective bias cord layers are tensed along the outer periphery of the wheel, and shearing deformation in the crawler width direction arises respectively thereat. At the wound-around portion, the shearing deformation of the fourth bias cord layer which is at the outermost outer peripheral side is the greatest, and the shearing deformation becomes smaller in the order of the third bias cord layer, the second bias cord layer and the first bias cord layer, i.e., toward the inner peripheral side of the fourth bias cord layer. Further, the direction of the shearing deformation varies in accordance with the direction of inclination of the bias cords with respect to the crawler circumferential direction.

Here, if the third bias cords of the third bias cord layer, which is at the inner peripheral side of the fourth bias cord layer, and the second bias cords of the second bias cord layer, which is even further toward the inner peripheral side, are inclined, with respect to the crawler circumferential direction, in the direction opposite the fourth bias cords of the fourth bias cord layer that is at the outermost peripheral side, at the above-described wound-around portion, the shearing deformation that combines the shearing deformation of the third bias cord layer and the second bias cord layer works to offset the shearing deformation of the fourth bias cord layer. Therefore, torsional deformation of the crawler that is caused by shearing deformation is suppressed, and the straight traveling stability of the crawler is ensured.

As described above, at the wound-around portion, the shearing deformation of the fourth bias cord layer that is at the outermost outer peripheral side is the greatest, and the shearing deformation becomes smaller in the order of the third bias cord layer, the second bias cord layer and the first bias cord layer, i.e., toward the inner peripheral side of the fourth bias cord layer. Therefore, keeping the shearing deformation to a minimum can be realized easily by inclining the third bias cords and the second bias cords, which are at the inner peripheral side of the fourth bias cords, in the direction opposite, with respect to the crawler circumferential direction, to the direction of inclination of the fourth bias cords. Note that, when the first bias cords are inclined in the same direction as the third bias cords and the second bias cords, the effect of cancelling-out the shearing deformation of the fourth bias cord layer becomes excessive, and it becomes difficult to ensure the straight traveling stability of the crawler. Therefore, the first bias cords are inclined in the direction opposite to the third bias cords and the second bias cords, i.e., in the same direction as the fourth bias cords.

Note that if both the third bias cords and the second bias cords are not inclined in the direction opposite the fourth bias cords, the effect of canceling the shearing deformation of the fourth bias cord layer is insufficient, and it is difficult to ensure the straight traveling stability of the crawler.

In a second aspect of the present invention, in the crawler relating to the first aspect, a main cord layer, at which main cords that extend along the crawler circumferential direction are lined up in a crawler width direction, is disposed at a crawler inner peripheral side of the first bias cord layer.

In the crawler relating to the second aspect, due to the main cords that extend along the crawler circumferential direction, the tensile rigidity in the crawler circumferential direction can be improved, and the amounts of shearing deformation of the first through fourth bias cord layers can be reduced, and therefore, the straight traveling ability can be further improved.

A third aspect of the present invention has, in the crawler relating to the second aspect, an inner side reinforcing cord layer that is embedded in the crawler main body and is disposed at a crawler inner peripheral side of the main cord layer, and at which reinforcing cords that extend along the crawler width direction are lined up in the crawler circumferential direction.

In the crawler relating to the third aspect, the inner side reinforcing cord layer, at which reinforcing cords that extend along the crawler width direction are lined up in the crawler circumferential direction, is provided at the crawler inner peripheral side of the main cord layer. Therefore, the bending rigidity in the width direction of the crawler can be increased further.

Further, because the inner side reinforcing cord layer is provided at the crawler inner peripheral side of the main cord layer, the crawler can be reinforced from the inner peripheral surface side thereof.

A fourth aspect of the present invention has, in the crawler relating to the second aspect or the third aspect, an outer side reinforcing cord layer that is embedded in the crawler main body, and is disposed at a crawler outer peripheral side of the main cord layer, and at which reinforcing cords that extend along the crawler width direction are lined up in the crawler circumferential direction.

In the crawler relating to the fourth aspect, the outer side reinforcing cord layer, at which reinforcing cords that extend along the crawler width direction are lined up in the crawler circumferential direction, is provided at the crawler outer peripheral side of the main cord layer. Therefore, the bending rigidity in the width direction of the crawler can be increased.

Further, because the outer side reinforcing cords are provided at the crawler outer peripheral side of the main cord layer, the crawler can be reinforced from the outer peripheral surface side thereof.

In a fifth aspect of the present invention, in the crawler of any one of the first aspect through the fourth aspect, one or more first additional bias cord layers, at which first bias cords that extend at an incline with respect to the crawler circumferential direction are lined up in the crawler circumferential direction, are provided at a crawler inner peripheral side of the first bias cord layer.

In the crawler relating to the fifth aspect, one or more first additional bias cord layers, at which first additional bias cords that extend at an incline with respect to the crawler circumferential direction are lined up in the crawler circumferential direction, are provided at the crawler inner peripheral side of the first bias cord layer. Therefore, the rigidity of the crawler can be increased.

In a sixth aspect of the present invention, in the crawler of any one of the second aspect through the fourth aspect, further comprise one or more second additional bias cord layers, which are embedded in the crawler main body and are disposed at a crawler inner peripheral side of the main cord layer, and at which second additional bias cords, that extend at an incline in a same direction as the first bias cords of the first bias cord layer with respect to the crawler circumferential direction, are lined up in the crawler circumferential direction.

In the crawler relating to the sixth aspect, the second additional bias cords are provided at the opposite side of the first bias cords with respect to the main cords that are the center of bending of the crawler. Therefore, at the time when the crawler bends, the second additional bias cord layer twists toward the side opposite the first bias cord layer and functions to cancel-out the twisting of the first bias cord layer. Because the first bias cord layer and the second addition bias cord layer are disposed with the main cord layer therebetween, the thickness of the bias cord layers from the innermost periphery to the outermost periphery becomes thicker. Accordingly, the rigidity of the crawler can be increased.

Advantageous Effects of Invention

As described above, because the crawlers relating to the present aspects have the above-described structures, the straight traveling ability can be ensured while the rigidity is improved.

DESCRIPTION OF EMBODIMENTS

First Embodiment

A rubber crawler 10 relating to a first embodiment of the present invention is described in accordance with FIG. 1 through FIG. 4. The rubber crawler 10, which is endless and serves as a crawler relating to an embodiment of the present invention, is a so-called coreless type rubber crawler that does not have metal cores.

Figure 1:
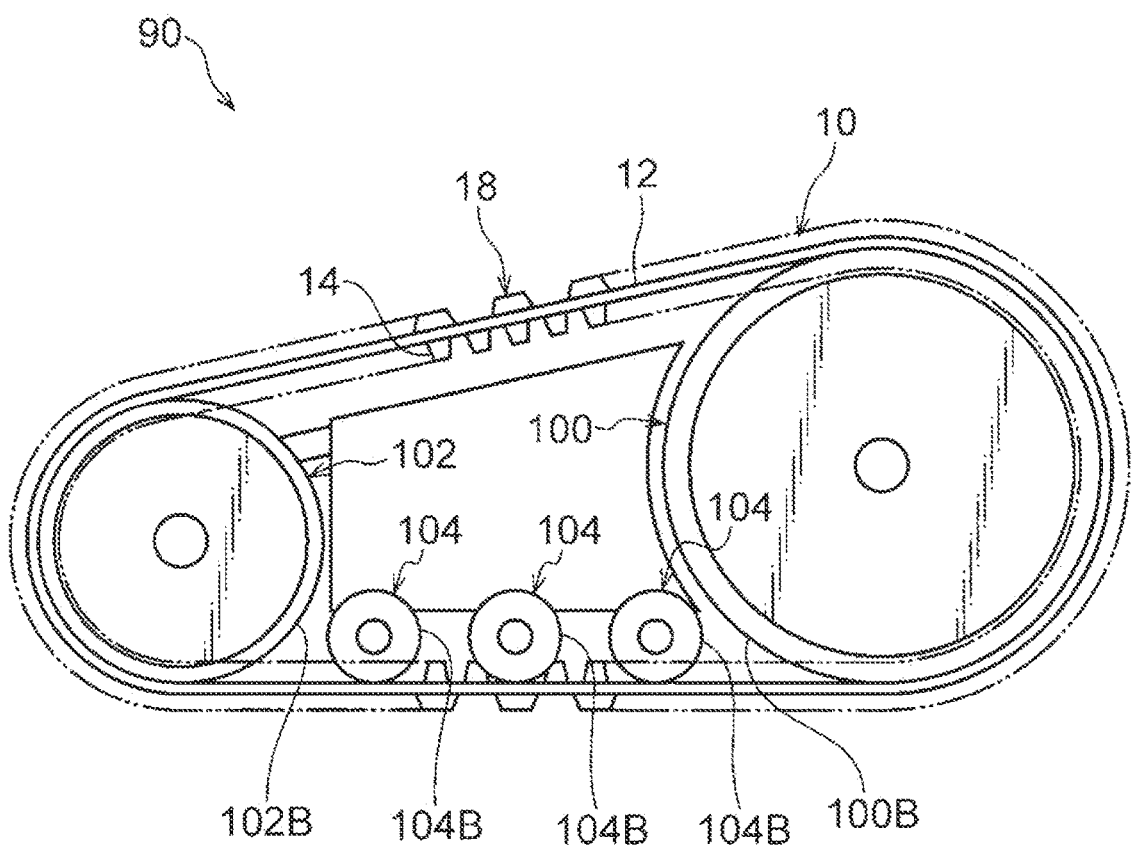
FIG. 1 is a side view that is seen from a side (the crawler width direction) and shows a rubber crawler relating to a first embodiment of the present invention.

As shown in FIG. 1, the rubber crawler 10 is used while wound around a driving wheel 100 that is connected to a driving shaft of a crawler vehicle that serves as a machine body, and a idler wheel 102 that is mounted to the crawler vehicle so as to rotate freely. Further, plural rolling wheels 104, which are disposed between the driving wheel 100 and the idler wheel 102 and are mounted to the crawler vehicle so as to rotate freely, roll at the inner periphery of the rubber crawler 10.

Figure 2:
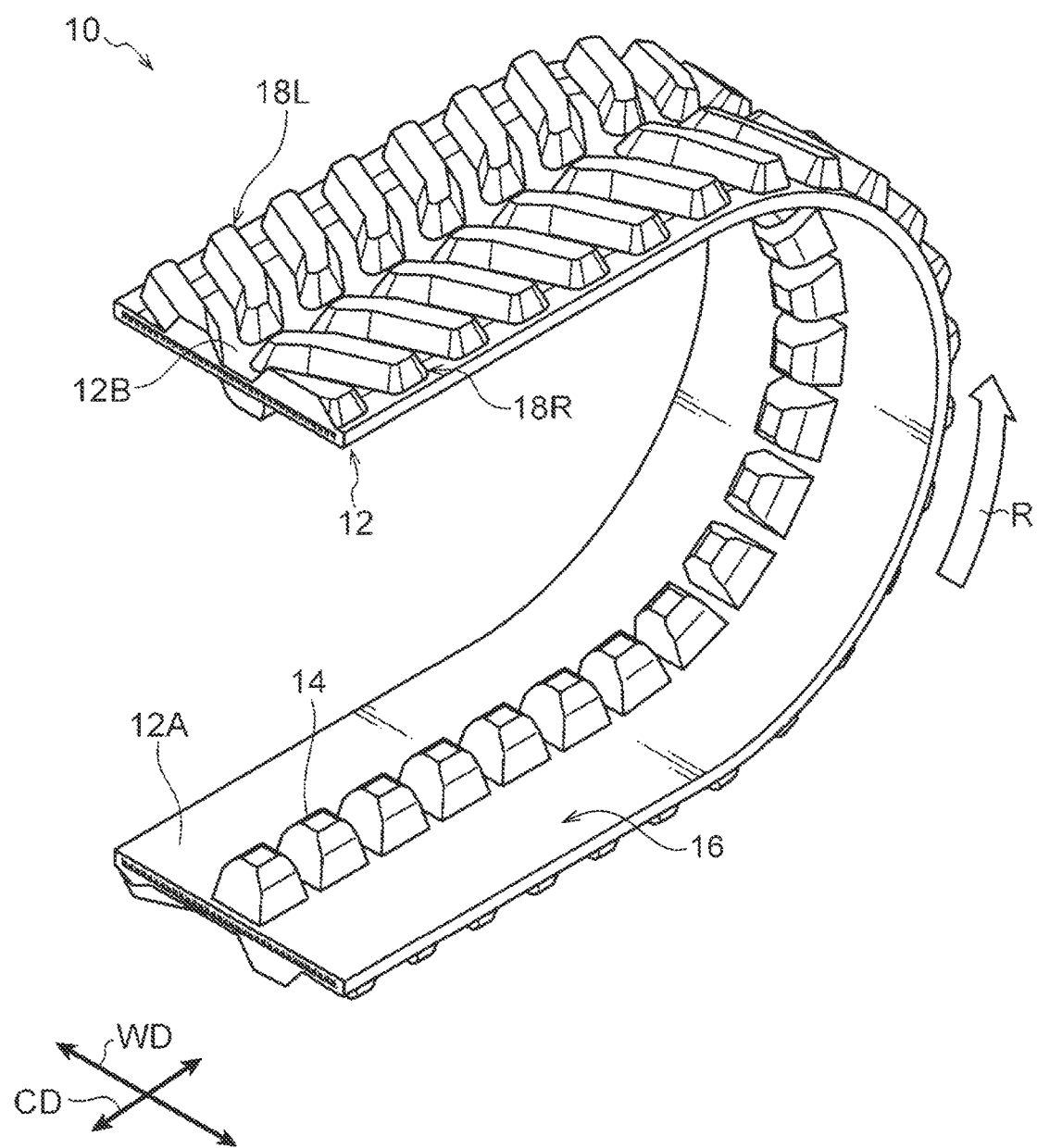
FIG. 2 is a perspective view that includes a partial cross-section and shows the rubber crawler relating to the first embodiment of the present invention.

As shown in FIG. 2, in the present embodiment, the circumferential direction (shown by arrow CD in FIG. 2) of the endless rubber crawler 10 is called the "crawler circumferential direction", and the width direction (shown by arrow WD in FIG. 2) of the rubber crawler 10 is called the "crawler width direction". Note that the crawler circumferential direction (that has the same meaning as the length direction of the rubber crawler 10) and the crawler width direction are orthogonal when the rubber crawler 10 is viewed from the inner peripheral side or the outer peripheral side.

Figure 3:
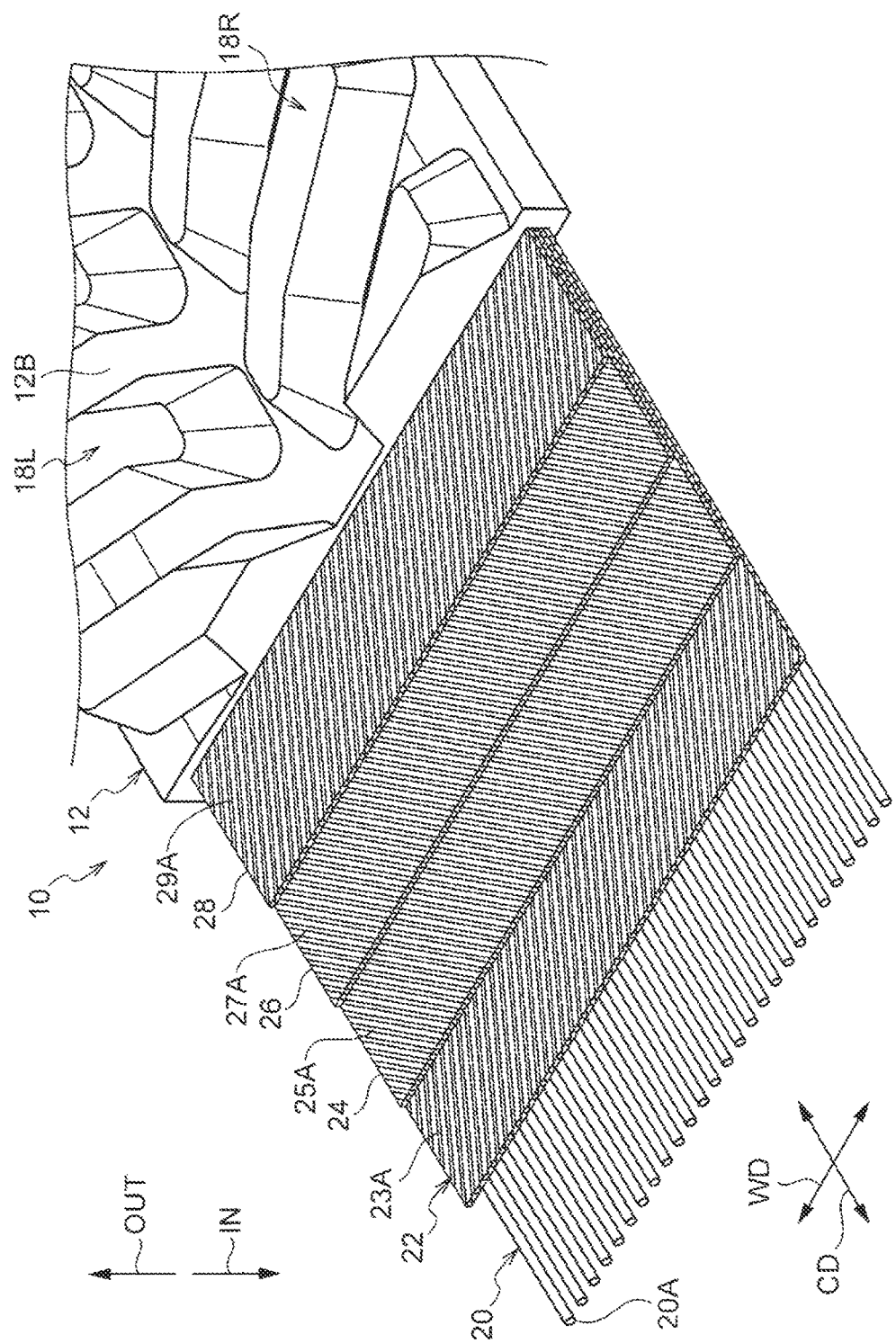
FIG. 3 is a perspective view that includes partial cross-sections of respective cord layers and shows the rubber crawler relating to the first embodiment of the present invention.

Further, in the present embodiment, the inner peripheral side of the rubber crawler 10, which is wound around the driving wheel 100 and the idler wheel 102 and is annular (including circular annular, elliptical annular, polygonal annular and the like), the side in the direction shown by arrow IN in FIG. 3, is called the "crawler inner peripheral side", and the outer peripheral side of the rubber crawler 10, the side in the direction shown by arrow OUT in FIG. 3, is called the "crawler outer peripheral side". Note that the arrow IN direction (the inner side direction of the annulus) and the arrow OUT direction (the outer side direction of the annulus) in FIG. 3 indicate the in-out direction of the rubber crawler 10 which is in a wound-around state (the same meaning as the thickness direction of the rubber crawler 10).

Note that, in the present embodiment, the rubber crawler 10 is structured so as to be wound around the driving wheel 100 and the idler wheel 102, but the present invention is not limited to this structure. For example, depending on the arrangement of the driving wheel 100, the idler wheel 102 and the rolling wheels 104, the rubber crawler 10 may be a structure that is wound around one of or plural of the rolling wheels 104 in addition to the driving wheel 100 and the idler wheel 102.

Further, a crawler running device 90 (see FIG. 1) that serves as the running section of the crawler vehicle is structured by the driving wheel 100, the idler wheel 102, the rolling wheels 104, and the rubber crawler 10 that is wound around these.

As shown in FIG. 1, the driving wheel 100 has a pair of wheel portions that are disc-shaped and are connected to the driving shaft of the crawler vehicle. Outer peripheral surfaces 100B of these wheel portions respectively contact wheel rolling surfaces 16 (see FIG. 2) of a crawler main body 12 that is described later, and roll on these wheel rolling surfaces 16. This driving wheel 100 applies driving force from the crawler vehicle to the rubber crawler 10 (details described hereinafter), and causes the rubber crawler 10 to circulate between the driving wheel 100 and the idler wheel 102.

The idler wheel 102 has a pair of wheel portions 102A that are disc-shaped and are mounted to the crawler vehicle so as to rotate freely. Outer peripheral surfaces 102B of these wheel portions 102A respectively contact the wheel rolling surfaces 16 and roll on these wheel rolling surfaces 16. Further, by an unillustrated pressure-applying mechanism that is hydraulic or the like and that the crawler vehicle side has, the idler wheel 102 is moved in a direction of moving away from the driving wheel 100 and is pushed-against the wheel rolling surfaces 16. Due to the idler wheel 102 being pushed against the wheel rolling surfaces 16 in this way, tension (tensile force) of the rubber crawler 10 that is wound around the driving wheel 100 and the idler wheel 102 is ensured.

The rolling wheel 104 has a pair of wheel portions that are disc-shaped and are mounted to the crawler vehicle so as to rotate freely. Outer peripheral surfaces 104B of these wheel portions respectively contact the wheel rolling surfaces 16 and roll on these wheel rolling surfaces 16. The weight of the crawler vehicle is supported by these rolling wheels 104. Note that the above-described idler wheel 102 and rolling wheels 104 are slave-rotated with respect to the rubber crawler 10 that circulates between the driving wheel 100 and the idler wheel 102.

Here, due to the rubber crawler 10 (the crawler main body 12) being wound around the driving wheel 100 and the idler wheel 102 at a predetermined tensile force, friction arises between the outer peripheral surfaces 100B of the driving wheel 100 and the wheel rolling surfaces 16, the driving force of the driving wheel 100 is transmitted to the rubber crawler 10, the rubber crawler 10 circulates between the driving wheel 100 and the idler wheel 102, and the rubber crawler 10 runs.

(Rubber Crawler)

As shown in FIG. 1 and FIG. 2, the rubber crawler 10 has the crawler main body 12 at which a rubber material, which serves as an example of an elastic material, is formed in the shape of an endless belt. Note that the crawler main body 12 of the present embodiment is an example of the crawler main body that is shaped as an endless belt of the present invention. Further, the circumferential direction, the width direction, the inner peripheral side and the outer peripheral side of the crawler main body 12 of the present embodiment coincide with the crawler circumferential direction, the crawler width direction, the crawler inner peripheral side and the crawler outer peripheral side, respectively.

Figure 4:
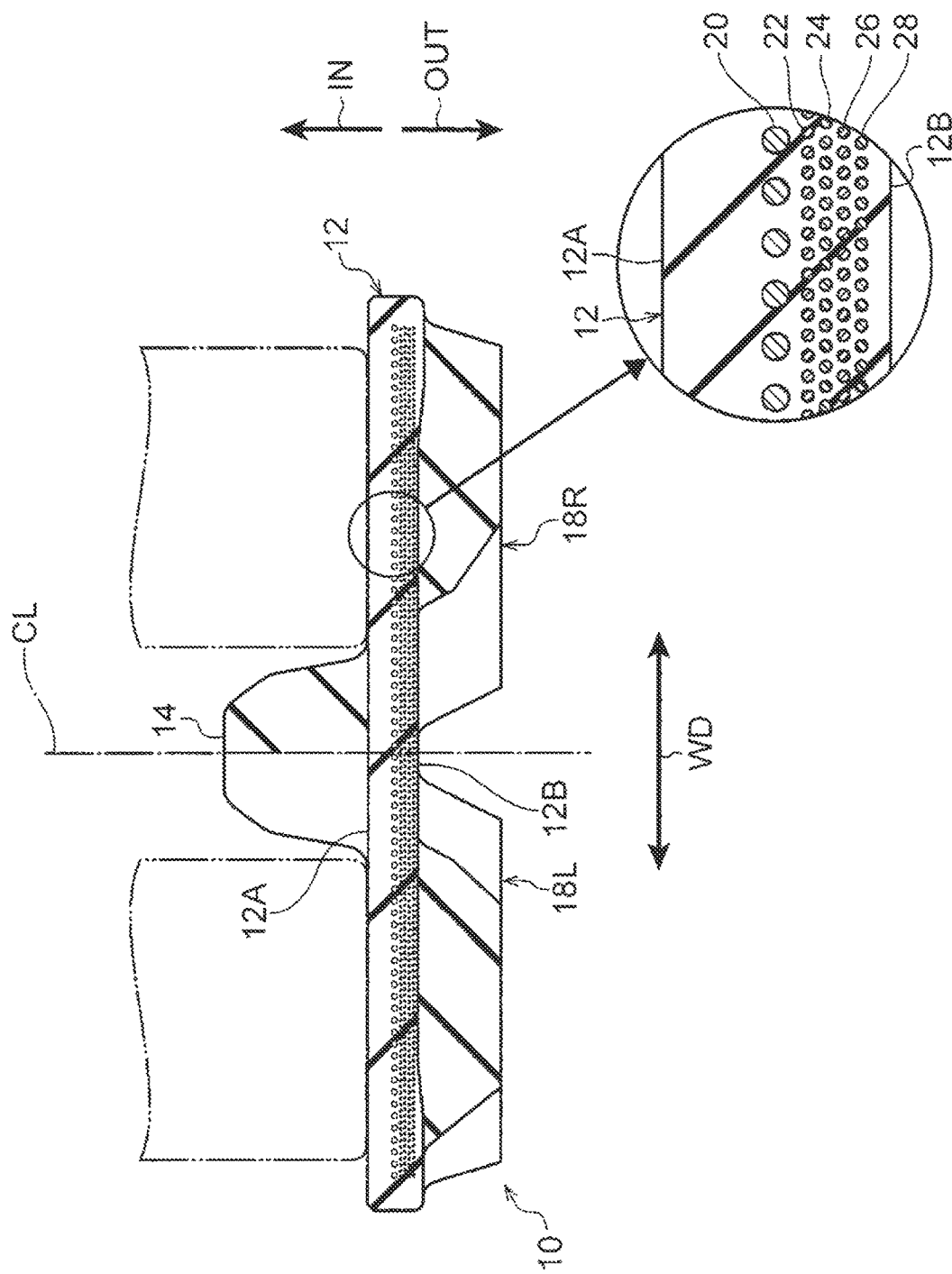
FIG. 4 is a cross-sectional view, in a direction orthogonal to the crawler circumferential direction, that shows the rubber crawler relating to the first embodiment of the present invention.

As shown in FIG. 2 and FIG. 4, plural rubber projections 14, which project-out from an inner peripheral surface 12A toward the crawler inner peripheral side, are formed at the crawler main body 12 at an interval in the crawler circumferential direction. These rubber projections 14 are disposed on a central line CL that runs along the crawler width direction center of the crawler main body 12. Further, due to the rubber projections 14 abutting the wheels that roll on the wheel rolling surfaces 16 (meaning the driving wheel 100, the idler wheel 102, and the rolling wheels 104), movement of these wheels in the crawler width direction is limited.

The wheel rolling surfaces 16 that extend along the crawler circumferential direction are formed respectively at the crawler width direction both outer sides with the rubber projections 14 of the crawler main body 12 therebetween. These wheel rolling surfaces 16 are flat and structure portions of the inner peripheral surface 12A of the crawler main body 12.

As shown in FIG. 1 and FIG. 2, plural lugs 18, which project-out from an outer peripheral surface 12B toward the crawler outer peripheral side, are provided at the crawler main body 12. As shown in FIG. 4, the lugs 18 are disposed alternately in the crawler circumferential direction at a crawler width direction one side (the left side in FIG. 4) and another side (the right side in FIG. 4) with the central line CL of the crawler main body 12 therebetween, and are distributed respectively at the crawler width direction one side and other side. Hereinafter, appropriately, the lugs 18 at the crawler width direction one side are called lugs 18L, and the lugs 18 at the crawler width direction other side are called the lugs 18R.

As shown in FIG. 2, the lugs 18 of the present embodiment extend at inclines with respect to the crawler width direction, but may extend along the crawler width direction. In the present embodiment, the lugs 18 are structured so as to have left-right symmetrical shapes across the central line CL, but are not limited to this structure. For example, the lugs 18 may be structured so as to have shapes that are asymmetrical to the left and right across the central line CL.

(Cord Layers)

As shown in FIG. 3 and FIG. 4, a main cord layer 20, a first bias cord layer 22, a second bias cord layer 24, a third bias cord layer 26 and a fourth bias cord layer 28 are embedded in the crawler main body 12 in that order from the crawler inner peripheral side.

The main cord layer 20 is shaped as an endless belt, and has main cords 20A that extend in the crawler circumferential direction. The main cords 20A are structured by plural strands being twisted together. Note that, in the present embodiment, as an example, the aforementioned strands are formed by plural filaments being twisted together, but the present invention is not limited to this structure. Further, the main cords 20A may be covered with rubber.

Further, in the present embodiment, steel cords having excellent tensile strength are used as the main cords 20A, but the present invention is not limited to this structure. Organic fiber cords that are structured from organic fibers (e.g., aliphatic polyamide fibers, aromatic polyamide fibers, and the like) may be used as the above-described main cords 20A provided that they have sufficient tensile strength.

The first bias cord layer 22 is shaped as an endless belt, and is superposed on the crawler outer peripheral side of the main cord layer 20. This first bias cord layer 22 is formed by plural bias cords 23A, which extend at an incline with respect to the crawler circumferential direction as seen in a crawler plan view, being lined up in the crawler circumferential direction and being embedded in a belt-shaped rubber.

The second bias cord layer 24 is shaped as an endless belt, and is superposed on the crawler outer peripheral side of the first bias cord layer 22. This second bias cord layer 24 is formed by plural bias cords 25A, which extend at an incline with respect to the crawler circumferential direction as seen in a crawler plan view and which intersect the bias cords 23A of the first bias cord layer 22, being lined up in the crawler circumferential direction and being embedded in a belt-shaped rubber. Concretely, the bias cords 25A of the second bias cord layer 24 are inclined, with respect to the crawler circumferential direction, in the direction opposite the bias cords 23A of the first bias cord layer 22.

The third bias cord layer 26 is shaped as an endless belt, and is superposed on the crawler outer peripheral side of the second bias cord layer 24. This third bias cord layer 26 is formed by plural bias cords 27A being lined up in the crawler circumferential direction and being embedded in a belt-shaped rubber. Concretely, the bias cords 27A of the third bias cord layer 26 are inclined, with respect to the crawler circumferential direction, in the same direction as the bias cords 25A of the second bias cord layer 24.

The fourth bias cord layer 28 is shaped as an endless belt, and is superposed on the crawler outer peripheral side of the third bias cord layer 26. This fourth bias cord layer 28 is formed by plural bias cords 29A, which extend at an incline with respect to the crawler circumferential direction as seen in a crawler plan view and which intersect the bias cords 27A of the third bias cord layer 26, being lined up in the crawler circumferential direction and being embedded in a belt-shaped rubber. Concretely, the bias cords 29A of the fourth bias cord layer 28 are inclined, with respect to the crawler circumferential direction, in the direction opposite the bias cords 27A of the third bias cord layer 26. In the present embodiment, the fourth bias cord layer 28 is the outermost layer at the outer peripheral side of the crawler main body 12.

In the present embodiment, the bias cords 23A, the bias cords 25A, the bias cords 27A and the bias cords 29A are all steel cords. Further, steel cords of smaller diameters than the main cords 20A are used for the bias cords 23A, the bias cords 25A, the bias cords 27A and the bias cords 29A, from the standpoint of flexibility with respect to bending of the rubber crawler 10. Note that the present invention is not limited to this structure, and organic fiber cords that are structured from organic fibers (e.g., aliphatic polyamide fibers, aromatic polyamide fibers, and the like) may be used as the bias cords 23A, the bias cords 25A, the bias cords 27A and the bias cords 29A, provided that they have sufficient tensile strength.

In the present embodiment, the first bias cord layer 22, the second bias cord layer 24, the third bias cord layer 26 and the fourth bias cord layer 28 are respectively set to the same width, but the respective widths thereof may be made to differ.

In the present embodiment, the first bias cord layer 22, the second bias cord layer 24, the third bias cord layer 26 and the fourth bias cord layer 28 have the same structure, but the respective structures thereof may be different.

In the present embodiment, the bias cords 23A, the bias cords 25A, the bias cords 27A and the bias cords 29A are steel cords of the same specifications, but the materials thereof, and in addition, the diameters and structures thereof, may be different.

In the present embodiment, the included number per unit width (number/cm) of the bias cords 23A, the bias cords 25A, the bias cords 27A and the bias cords 29A are respectively set to be the same, but may be different.

In the present embodiment, the angles of inclination with respect to the crawler circumferential direction of the bias cords 23A, the bias cords 25A, the bias cords 27A and the bias cords 29A are respectively set to be the same, but may be different. Namely, in the present embodiment, as seen from the crawler thickness direction, the bias cords 23A and the bias cords 29A are parallel, and the bias cords 25A and the bias cords 27A are parallel. Note that, in the present embodiment, as seen from the crawler thickness direction, the bias cords 23A and the bias cords 29A are parallel, and the bias cords 25A and the bias cords 27A are parallel, but the bias cords 23A and the bias cords 29A do not have to be parallel provided that they are inclined in the same direction, and the bias cords 25A and the bias cords 27A do not have to be completely parallel provided that they are inclined in the same direction. For example, in a case in which one bias cords and other bias cords are inclined in the same direction are seen in the crawler thickness direction, it is preferable that the difference between the angle of inclination of the one bias cords and the angle of inclination of the other bias cords be less than or equal to 30°.

It is preferable that the first bias cord layer 22, the second bias cord layer 24, the third bias cord layer 26 and the fourth bias cord layer 28 have the same structure. Due thereto, the types of members that structure the rubber crawler 10 can be kept to the minimum needed. In this case, in order to change the direction of inclination of the bias cords with respect to the crawler circumferential direction, it suffices to merely change the direction of affixing the cord layer.

Note that, in the present embodiment, the main cords 20A are disposed at the central portion in the thickness direction of the crawler main body 12 (the same meaning as the crawler in-out direction). However, the main cords 20A may be disposed so as to be offset from the thickness direction central portion of the crawler main body 12 toward the thickness direction inner peripheral side or outer peripheral side.

(Operation, Effects)

Operation and effects of the rubber crawler 10 of the present embodiment are described next. In accordance with the rubber crawler 10, the four bias cord layers that are the first bias cord layer 22, the second bias cord layer 24, the third bias cord layer 26 and the fourth bias cord layer 28 are provided at the crawler outer peripheral side of the main cord layer 20. Therefore, as compared with a crawler in which three bias cord layers are provided, the rigidity can be improved.

Examples of the rigidity are, for example, the bending rigidity in the crawler circumferential direction, the bending rigidity in the crawler width direction, the tensile rigidity in the crawler circumferential direction, the tensile rigidity in the crawler width direction, the torsional rigidity, the shearing rigidity in the crawler circumferential direction, the shearing rigidity in the crawler width direction, and the like. In accordance with the rubber crawler 10 of the present embodiment, one or more of the rigidities among these can be improved.

At the rubber crawler 10, at the portion that is wound around the driving wheel 100 or the idler wheel 102, at the time of running, the main cord layer 20, the first bias cord layer 22, the second bias cord layer 24, the third bias cord layer 26 and the fourth bias cord layer 28 are tensed along the wheel outer periphery, and shearing deformation in the crawler width direction arises at each. At the wound-about portion, the shearing deformation of the fourth bias cord layer 28 that is at the outermost outer peripheral side is the largest, and the shearing deformation becomes smaller in the order of the third bias cord layer 26, the second bias cord layer 24 and the first bias cord layer 22.

At the rubber crawler 10 of the present embodiment, the direction of inclination of the bias cords 27A of the third bias cord layer 26 and the direction of inclination of the bias cords 25A of the second bias cord layer 24 are, with respect to the crawler circumferential direction, directions that are opposite to the direction of inclination of the bias cords 29A of the fourth bias cord layer 28. Therefore, the shearing deformation of the fourth bias cord layer 28, and the shearing deformation of the third bias cord layer 26 and the shearing deformation of the second bias cord layer 24, cancel each other out, and torsional deformation of the rubber crawler 10 that is caused by shearing deformation is suppressed, and the straight traveling stability of the rubber crawler 10 is ensured.

Note that it is preferable that the width of the fourth bias cord layer 28 is set to within a range of 60% to 100% of the width of the third bias cord layer 26 that is adjacent thereto in the inner peripheral direction. If the width of the fourth bias cord layer 28 is less than 60% of the width of the third bias cord layer 26, even if the fourth bias cord layer 28 is provided, there is the concern that the effect of improving the rigidity of the rubber crawler 10 will be insufficient. On the other hand, if the width of the fourth bias cord layer 28 exceeds 100% of the width of the third bias cord layer 26, the shearing deformation of the fourth bias cord layer 28 is large, and therefore, it is difficult to ensure the straight traveling stability.

Second Embodiment

Figure 5:
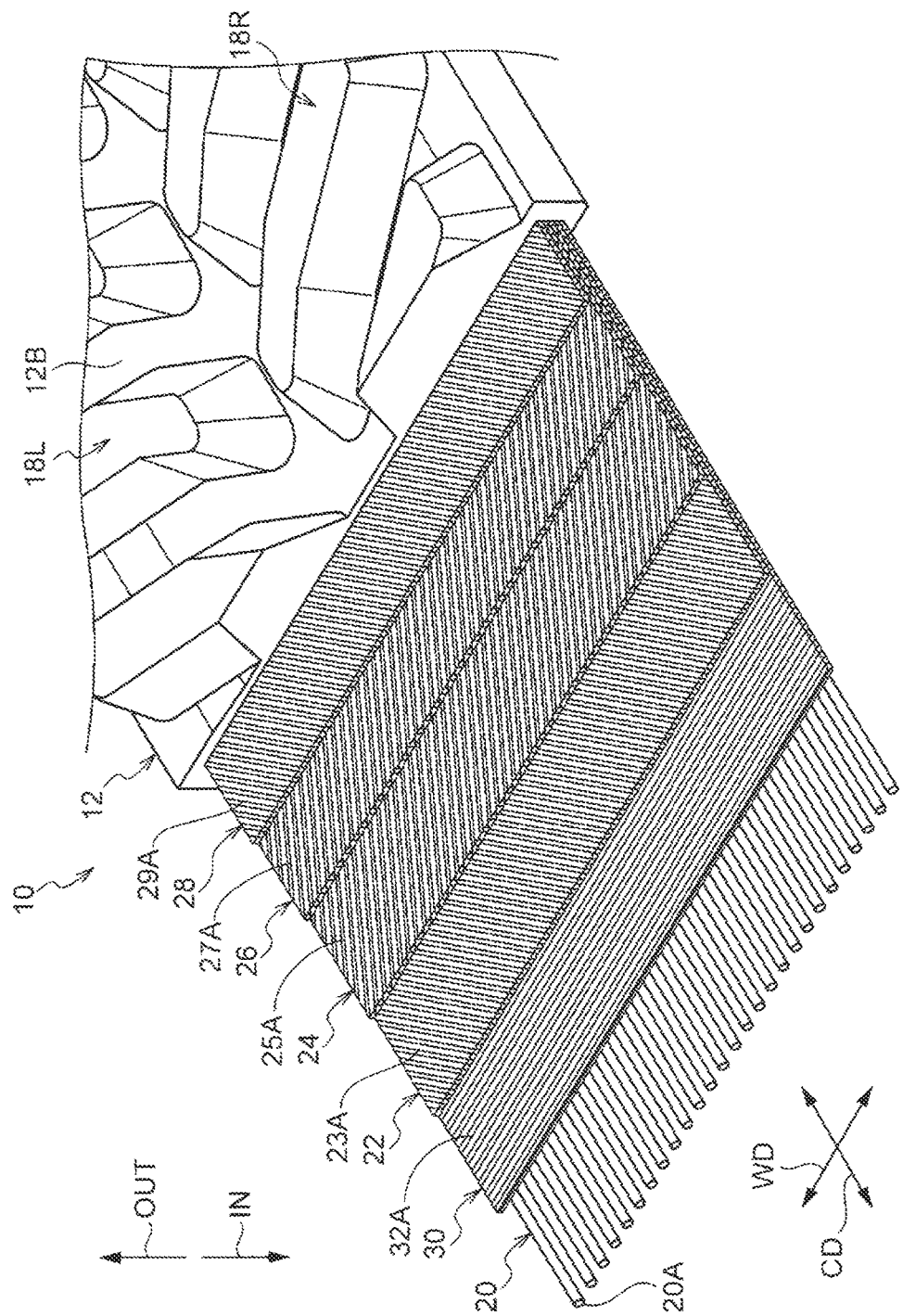
FIG. 5 is a perspective view that includes partial cross-sections of respective cord layers and shows a rubber crawler relating to a second embodiment of the present invention.

The rubber crawler 10 relating to a second embodiment of the present invention is described in accordance with FIG. 5. Note that structures that are the same as those of the first embodiment are denoted by the same reference numerals, and description thereof is omitted. In the rubber crawler 10 of the present embodiment, an outer side reinforcing cord layer 30 that is shaped as an endless belt is disposed between the main cord layer 20 and the first bias cord layer 22.

The outer side reinforcing cord layer 30 is shaped as an endless belt, and is superposed on the crawler outer peripheral side of the main cord layer 20. This outer side reinforcing cord layer 30 is formed by a single reinforcing ply that is shaped as an endless belt.

The reinforcing ply is formed by plural reinforcing cords 32A, which extend along the crawler width direction (in other words, the direction orthogonal to the central line CL), being lined up in the crawler circumferential direction and being embedded in a belt-shaped rubber. Note that, here, "extend along the crawler width direction" also includes cases of being inclined around ±3° with respect to the crawler width direction.

Note that, in the present embodiment, the directions of inclination of the bias cords 23A, the bias cords 25A, the bias cords 27A and the bias cords 29A are set to the opposite directions as in the first embodiment.

At the outer side reinforcing cord layer 30, because the reinforcing cords 32A extend along the crawler width direction, the bending rigidity in the crawler width direction is higher than in the crawler circumferential direction. In other words, it is difficult for the outer side reinforcing cord layer 30 to bendingly deform in the crawler width direction. Therefore, the rubber crawler 10 of the present embodiment has bending rigidity in the crawler width direction that is higher than that of the first rubber crawler 10, and bending deformation in the crawler width direction is suppressed. Due thereto, the durability of the rubber crawler 10 improves.

For the reinforcing cords 32A of the present embodiment, steel cords are used in order to increase the bending rigidity in the crawler width direction. However, the present invention is not limited to this structure, and organic fiber cords that are structured from organic fibers (e.g., aliphatic polyamide fibers, aromatic polyamide fibers, and the like) may be used as the above-described reinforcing cords 32A provided that they have sufficient bending rigidity in the crawler width direction.

In the rubber crawler 10 of the present embodiment, because the outer side reinforcing cord layer 30 is disposed at the crawler outer peripheral side of the main cord layer 20, the speed of progression until cracks, which are caused by external damage to the outer peripheral surface 12B of the crawler main body 12, reach the main cord layer 20 can be slowed. By increasing the time until cracks reach the main cord layer 20 in this way, problems with the main cords 20A due to penetration of water from the exterior can be suppressed over a long time, and therefore, the durability of the rubber crawler 10 improves.

Note that the outer side reinforcing cord layer 30 of the present embodiment is formed by the one reinforcing ply, but may be formed by two or more of the reinforcing plies.

Third Embodiment

Figure 6:
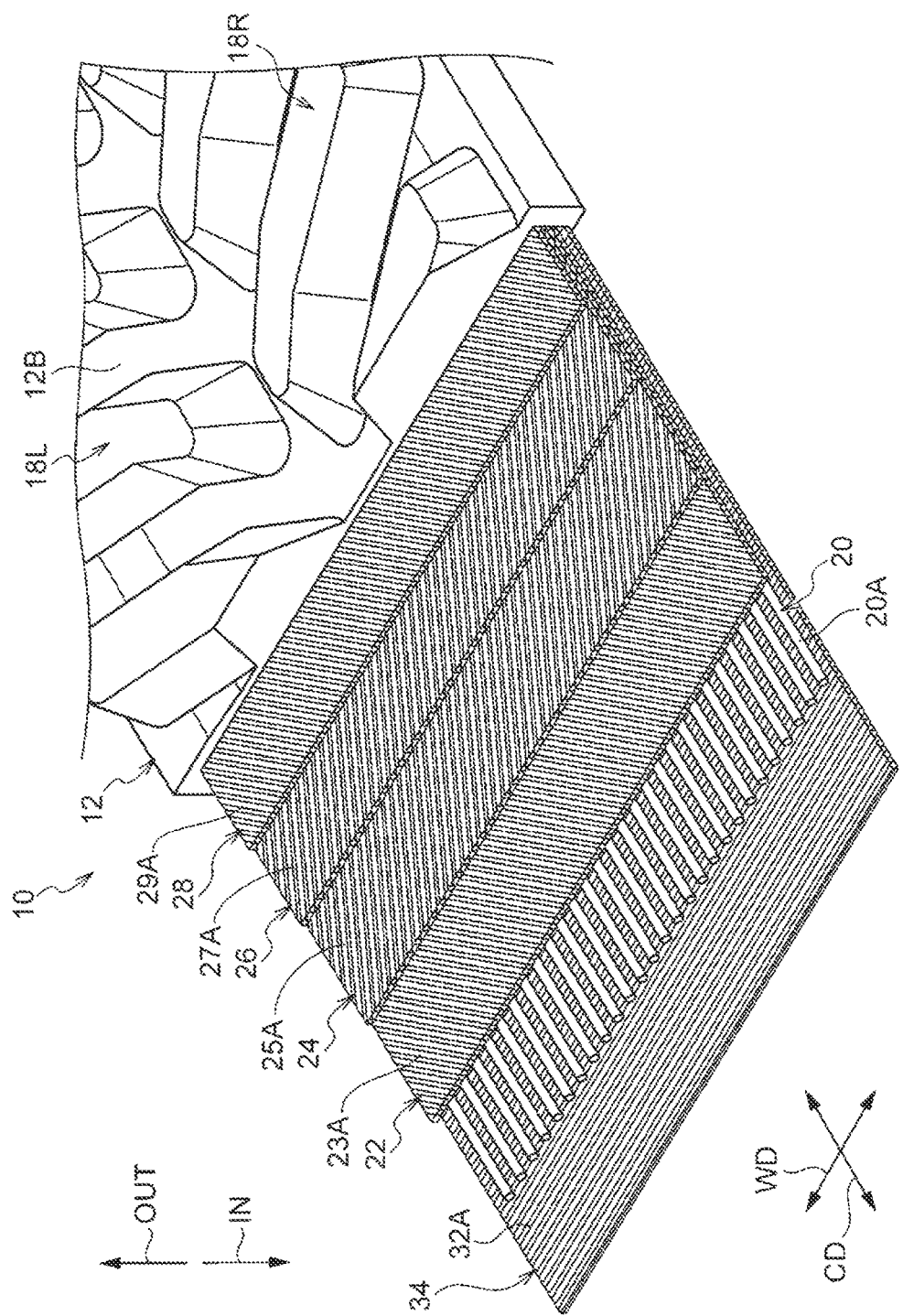
FIG. 6 is a perspective view that includes partial cross-sections of respective cord layers and shows a rubber crawler relating to a third embodiment of the present invention.

The rubber crawler 10 relating to a third embodiment of the present invention is described in accordance with FIG. 6. Note that structures that are the same as those of the first embodiment are denoted by the same reference numerals, and description thereof is omitted. In the rubber crawler 10 of the present embodiment, an inner side reinforcing cord layer 34 is disposed at the inner peripheral side of the main cord layer 20.

The inner side reinforcing cord layer 34 is shaped as an endless belt, and is superposed on the crawler inner peripheral side of the main cord layer 20. This inner side reinforcing cord layer 34 is formed by a single reinforcing ply that is shaped as an endless belt and has a structure similar to that of the reinforcing ply of the second embodiment. Therefore, in the same way as the rubber crawler 10 of the second embodiment, at the rubber crawler 10 of the present embodiment, the bending rigidity in the crawler width direction is high, and bending deformation in the crawler width direction is suppressed. Due thereto, the durability of the rubber crawler 10 improves.

Further, in the rubber crawler 10 of the present embodiment, because the inner side reinforcing cord layer 34 is disposed at the crawler inner peripheral side of the main cord layer 20, the speed of progression until cracks, which are caused by external damage to the inner peripheral surface 12A of the crawler main body 12, reach the main cord layer 20 can be slowed. By increasing the time until cracks reach the main cord layer 20 in this way, problems with the main cords 20A due to the penetration of water from the exterior can be suppressed over a long time, and therefore, the durability of the rubber crawler 10 improves.

Note that the inner side reinforcing cord layer 34 of the present embodiment is formed by the one reinforcing ply, but may be formed by two or more of the reinforcing plies.

Fourth Embodiment

Figure 7:
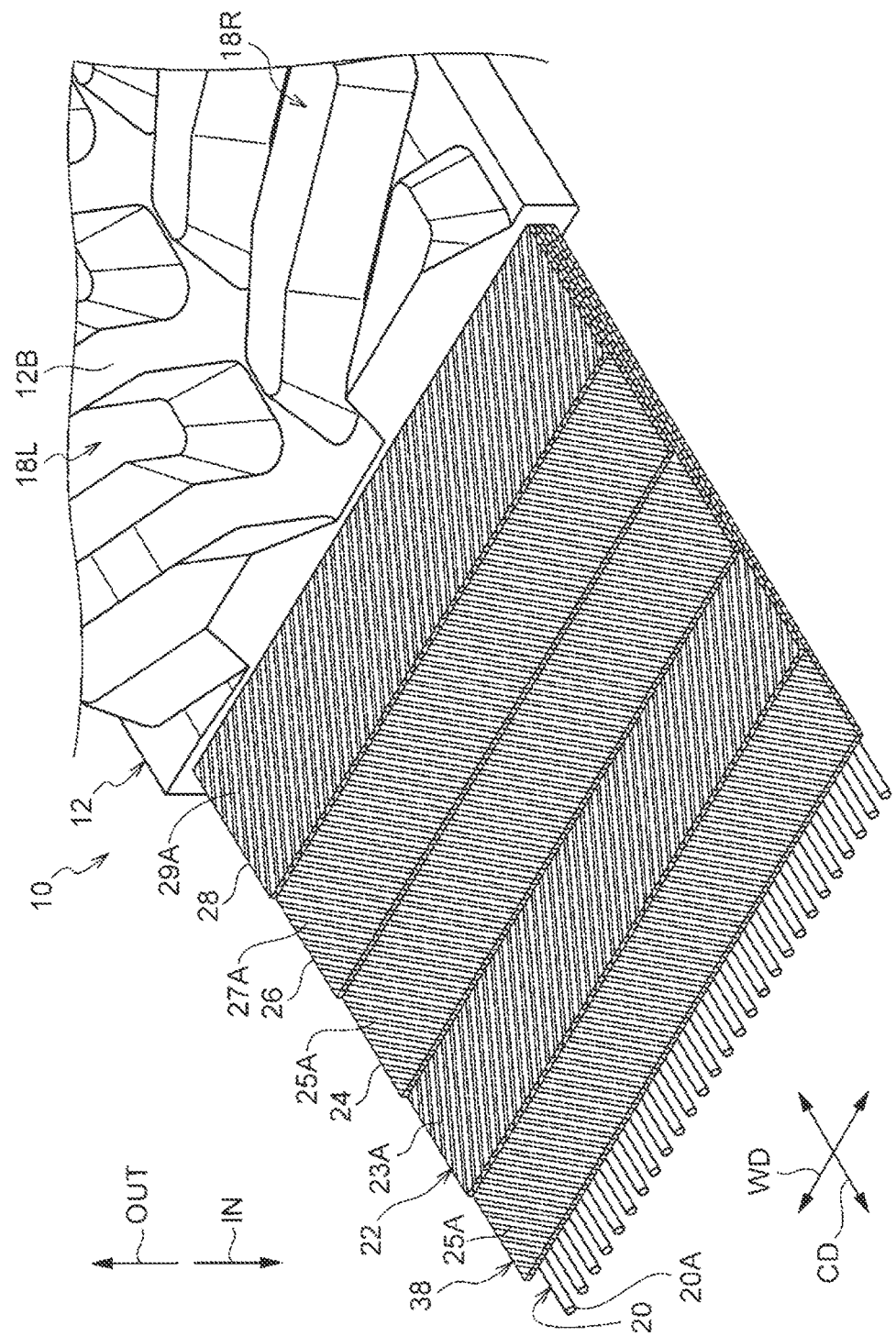
FIG. 7 is a perspective view that includes partial cross-sections of respective cord layers and shows a rubber crawler relating to a fourth embodiment of the present invention.

The rubber crawler 10 relating to a fourth embodiment of the present invention is described in accordance with FIG. 7. Note that structures that are the same as those of the above-described embodiments are denoted by the same reference numerals, and description thereof is omitted.

In the above-described embodiments, the four bias cord layers that are the first bias cord layer 22, the second bias cord layer 24, the third bias cord layer 26 and the fourth bias cord layer 28 are provided at the outer peripheral side of the main cord layer 20. However, as shown in FIG. 7, a first additional bias cord layer 38 may be added between the main cord layer 20 and the first bias cord layer 22, such that five or more bias cord layers are provided at the outer peripheral side of the main cord layer 20. Due thereto, the rigidity of the rubber crawler 10 can be improved more. Note that, even in a case in which there are five or more bias cord layers, the bias cord layer that is at the outermost outer peripheral side is the fourth bias cord layer 28, and at the inner peripheral side thereof is the third bias cord layer 26, and still further toward the inner peripheral side is the second bias cord layer 24.

Fifth Embodiment

Figure 8:
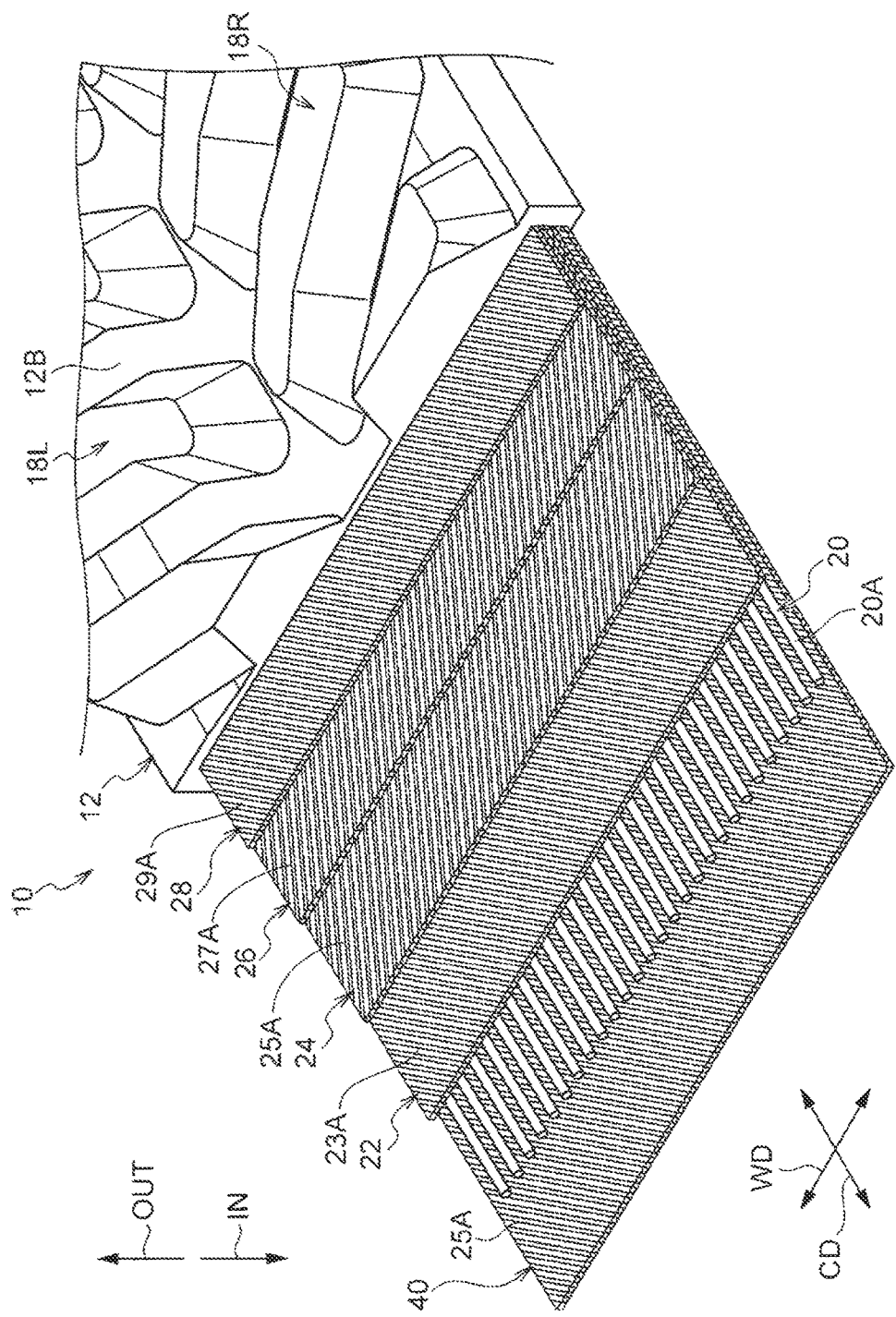
FIG. 8 is a perspective view that includes partial cross-sections of respective cord layers and shows a rubber crawler relating to a fifth embodiment of the present invention.

The rubber crawler 10 relating to a fifth embodiment of the present invention is described in accordance with FIG. 8. Note that structures that are the same as those of the above-described embodiments are denoted by the same reference numerals, and description thereof is omitted.

As shown in FIG. 8, at the rubber crawler 10 of the present embodiment, a second additional bias cord layer 40 is disposed at the inner peripheral side of the main cord layer 20. Accordingly, the bias cords 25A of the second additional bias cord layer 40 and the bias cords 23A of the first bias cord layer 22 are inclined in the same direction with respect to the crawler circumferential direction.

In the rubber crawler 10 of the present embodiment, the bias cords 25A of the second additional bias cord layer 40 are provided at the side, which is opposite to the bias cords 23A of the first bias cord layer 22, with respect to the main cords 20A of the main cord layer 20 that is the center of bending of the rubber crawler 10. Therefore, at the time when the rubber crawler 10 bends, the second additional bias cord layer 40 is twisted toward the side opposite the first bias cord layer 22, and acts to cancel out the twisting of the first bias cord layer 22.

Further, at the rubber crawler 10 of the present embodiment, the first bias cord layer 22 and the second additional bias cord layer 40 are disposed with the main cord layer 20 therebetween. Therefore, the thickness of the bias cord layers from the innermost periphery to the outermost periphery becomes thicker, and the rigidity of the rubber crawler 10 can be increased.

Other Embodiments

Although forms for embodying the present invention have been described above by using embodiments, these embodiments are examples, and can be embodied by being modified in various ways within a scope that does not depart from the gist thereof. Further, it goes without saying that the scope of the present invention is not limited to these embodiments.

In the rubber crawler 10, the outer side reinforcing cord layer 30 may be disposed at the outer peripheral side of the main cord layer 20, and the inner side reinforcing cord layer 34 may be disposed at the inner peripheral side of the main cord layer 20.

The outer side reinforcing cord layer 30 is not limited to being disposed between the main cord layer 20 and the first bias cord layer 22, and can also be disposed between other bias cord layers, and can also be disposed at the crawler outer peripheral side of the fourth bias cord layer 28. However, it is preferable for the outer side reinforcing cord layer 30 to be disposed between the main cord layer 20 and the first bias cord layer 22 as in the second embodiment.

The rubber crawlers 10 of the above-described embodiments are not provided with metal cores for reinforcement at the inner peripheral side of the main cord layer 20, but may be provided with metal cores.

The disclosure of Japanese Patent Application No. 2015-114141 that was filed on Jun. 4, 2015 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A crawler comprising:
   a crawler main body that is formed of an elastic material and is shaped as an endless belt;
   a first bias cord layer that is embedded in the crawler main body, the first bias cord layer comprising first bias cords, which extend at an incline with respect to a crawler circumferential direction, are lined up in the crawler circumferential direction;
a second bias cord layer that is embedded in the crawler main body and is disposed at a crawler outer peripheral side of the first bias cord layer, the second bias cord layer comprising second bias cords, which extend at an incline in a direction opposite to a direction of inclination of the first bias cords with respect to the crawler circumferential direction, are lined up in the crawler circumferential direction;
a third bias cord layer that is embedded in the crawler main body and is disposed at a crawler outer peripheral side of the second bias cord layer, the third bias cord layer comprising third bias cords, which extend at an incline in a same direction as a direction of inclination of the second bias cords with respect to the crawler circumferential direction, are lined up in the crawler circumferential direction; and
a fourth bias cord layer that is embedded in the crawler main body and is disposed at a crawler outer peripheral side of the third bias cord layer, the fourth bias cord layer comprising fourth bias cords, which extend at an incline in a direction opposite to a direction of inclination of the third bias cords with respect to the crawler circumferential direction, are lined up in the crawler circumferential direction.

2. The crawler of claim 1, wherein a main cord layer, comprising main cords that extend along the crawler circumferential direction are lined up in a crawler width direction, is disposed at a crawler inner peripheral side of the first bias cord layer.

3. The crawler of claim 2, comprising an inner side reinforcing cord layer that is embedded in the crawler main body and is disposed at a crawler inner peripheral side of the main cord layer, the inner side reinforcing cord layer comprising reinforcing cords that extend along the crawler width direction are lined up in the crawler circumferential direction.

4. The crawler of claim 2, comprising an outer side reinforcing cord layer that is embedded in the crawler main body and is disposed at a crawler outer peripheral side of the main cord layer, the outer side reinforcing cord layer comprising reinforcing cords that extend along the crawler width direction are lined up in the crawler circumferential direction.

5. The crawler of claim 1, wherein one or more first additional bias cord layers, comprising first additional bias cords that extend at an incline with respect to the crawler circumferential direction are lined up in the crawler circumferential direction, are provided at a crawler inner peripheral side of the first bias cord layer.

6. The crawler of claim 2, further comprising one or more second additional bias cord layers, which are embedded in the crawler main body and are disposed at a crawler inner peripheral side of the main cord layer, the one or more second additional bias cord layers comprising second additional bias cords, that extend at an incline in a same direction as the first bias cords of the first bias cord layer with respect to the crawler circumferential direction, are lined up in the crawler circumferential direction.

7. The crawler of claim 1, wherein a main cord layer, comprising main cords that extend along the crawler circumferential direction are lined up in a crawler width direction, is disposed at a crawler inner peripheral side of the first bias cord layer,
wherein one or more first additional bias cord layers, comprising first additional bias cords that extend at an incline with respect to the crawler circumferential direction are lined up in the crawler circumferential direction, are provided at a crawler inner peripheral side of the first bias cord layer.

8. The crawler of claim 1, wherein a main cord layer, comprising main cords that extend along the crawler circumferential direction are lined up in a crawler width direction, is disposed at a crawler inner peripheral side of the first bias cord layer,
the crawler further comprising one or more second additional bias cord layers, which are embedded in the crawler main body and are disposed at a crawler inner peripheral side of the main cord layer, the one or more second additional bias cord layers comprising second additional bias cords, that extend at an incline in a same direction as the first bias cords of the first bias cord layer with respect to the crawler circumferential direction, are lined up in the crawler circumferential direction.

9. The crawler of claim 1, wherein a main cord layer, comprising main cords that extend along the crawler circumferential direction are lined up in a crawler width direction, is disposed at a crawler inner peripheral side of the first bias cord layer,
the crawler further comprising:
an inner side reinforcing cord layer that is embedded in the crawler main body and is disposed at a crawler inner peripheral side of the main cord layer, the inner side reinforcing cord layer comprising reinforcing cords that extend along the crawler width direction are lined up in the crawler circumferential direction; and
an outer side reinforcing cord layer that is embedded in the crawler main body and is disposed at a crawler outer peripheral side of the main cord layer, the outer side reinforcing cord layer comprising reinforcing cords that extend along the crawler width direction are lined up in the crawler circumferential direction.

10. The crawler of claim 1, wherein a main cord layer, comprising main cords that extend along the crawler circumferential direction are lined up in a crawler width direction, is disposed at a crawler inner peripheral side of the first bias cord layer,
the crawler further comprising an inner side reinforcing cord layer that is embedded in the crawler main body and is disposed at a crawler inner peripheral side of the main cord layer, the inner side reinforcing cord layer comprising reinforcing cords that extend along the crawler width direction are lined up in the crawler circumferential direction,
wherein one or more first additional bias cord layers, comprising first additional bias cords that extend at an incline with respect to the crawler circumferential direction are lined up in the crawler circumferential direction, are provided at a crawler inner peripheral side of the first bias cord layer.

11. The crawler of claim 1, wherein a main cord layer, comprising main cords that extend along the crawler circumferential direction are lined up in a crawler width direction, is disposed at a crawler inner peripheral side of the first bias cord layer,
the crawler further comprising:
an inner side reinforcing cord layer that is embedded in the crawler main body and is disposed at a crawler inner peripheral side of the main cord layer, the inner side reinforcing cord layer comprising reinforcing cords that extend along the crawler width direction are lined up in the crawler circumferential direction; and
one or more second additional bias cord layers, which are embedded in the crawler main body and are disposed at a crawler inner peripheral side of the main cord layer, the one or more second additional bias cord layers comprising second additional bias cords, that extend at an incline in a same direction as the first bias cords of the first bias cord layer with respect to the crawler circumferential direction, are lined up in the crawler circumferential direction.

12. The crawler of claim 1, wherein a main cord layer, comprising main cords that extend along the crawler circumferential direction are lined up in a crawler width direction, is disposed at a crawler inner peripheral side of the first bias cord layer,
the crawler comprising an outer side reinforcing cord layer that is embedded in the crawler main body and is disposed at a crawler outer peripheral side of the main cord layer, the outer side reinforcing cord layer comprising reinforcing cords that extend along the crawler width direction are lined up in the crawler circumferential direction,
wherein one or more first additional bias cord layers, comprising first additional bias cords that extend at an incline with respect to the crawler circumferential direction are lined up in the crawler circumferential direction, are provided at a crawler inner peripheral side of the first bias cord layer.

13. The crawler of claim 1, wherein a main cord layer, comprising main cords that extend along the crawler circumferential direction are lined up in a crawler width direction, is disposed at a crawler inner peripheral side of the first bias cord layer,
the crawler further comprising:
an outer side reinforcing cord layer that is embedded in the crawler main body and is disposed at a crawler outer peripheral side of the main cord layer, the outer side reinforcing cord layer comprising reinforcing cords that extend along the crawler width direction are lined up in the crawler circumferential direction; and
one or more second additional bias cord layers, which are embedded in the crawler main body and are disposed at a crawler inner peripheral side of the main cord layer, the one or more second additional bias cord layers comprising second additional bias cords, that extend at an incline in a same direction as the first bias cords of the first bias cord layer with respect to the crawler circumferential direction, are lined up in the crawler circumferential direction.

14. The crawler of claim 1, wherein a main cord layer, comprising main cords that extend along the crawler circumferential direction are lined up in a crawler width direction, is disposed at a crawler inner peripheral side of the first bias cord layer, the crawler further comprising:
an inner side reinforcing cord layer that is embedded in the crawler main body and is disposed at a crawler inner peripheral side of the main cord layer, the inner side reinforcing cord layer comprising reinforcing cords that extend along the crawler width direction are lined up in the crawler circumferential direction; and
an outer side reinforcing cord layer that is embedded in the crawler main body and is disposed at a crawler outer peripheral side of the main cord layer, the outer side reinforcing cord layer comprising reinforcing cords that extend along the crawler width direction are lined up in the crawler circumferential direction,
wherein one or more first additional bias cord layers, comprising first additional bias cords that extend at an incline with respect to the crawler circumferential direction are lined up in the crawler circumferential direction, are provided at a crawler inner peripheral side of the first bias cord layer.

15. The crawler of claim 1, wherein a main cord layer, comprising main cords that extend along the crawler circumferential direction are lined up in a crawler width direction, is disposed at a crawler inner peripheral side of the first bias cord layer,
the crawler further comprising:
an inner side reinforcing cord layer that is embedded in the crawler main body and is disposed at a crawler inner peripheral side of the main cord layer, the inner side reinforcing cord layer comprising reinforcing cords that extend along the crawler width direction are lined up in the crawler circumferential direction;
an outer side reinforcing cord layer that is embedded in the crawler main body and is disposed at a crawler outer peripheral side of the main cord layer, the outer side reinforcing cord layer comprising reinforcing cords that extend along the crawler width direction are lined up in the crawler circumferential direction; and
one or more second additional bias cord layers, which are embedded in the crawler main body and are disposed at a crawler inner peripheral side of the main cord layer, the one or more second additional bias cord layers comprising second additional bias cords, that extend at an incline in a same direction as the first bias cords of the first bias cord layer with respect to the crawler circumferential direction, are lined up in the crawler circumferential direction.

* * * * *